Figure 3:
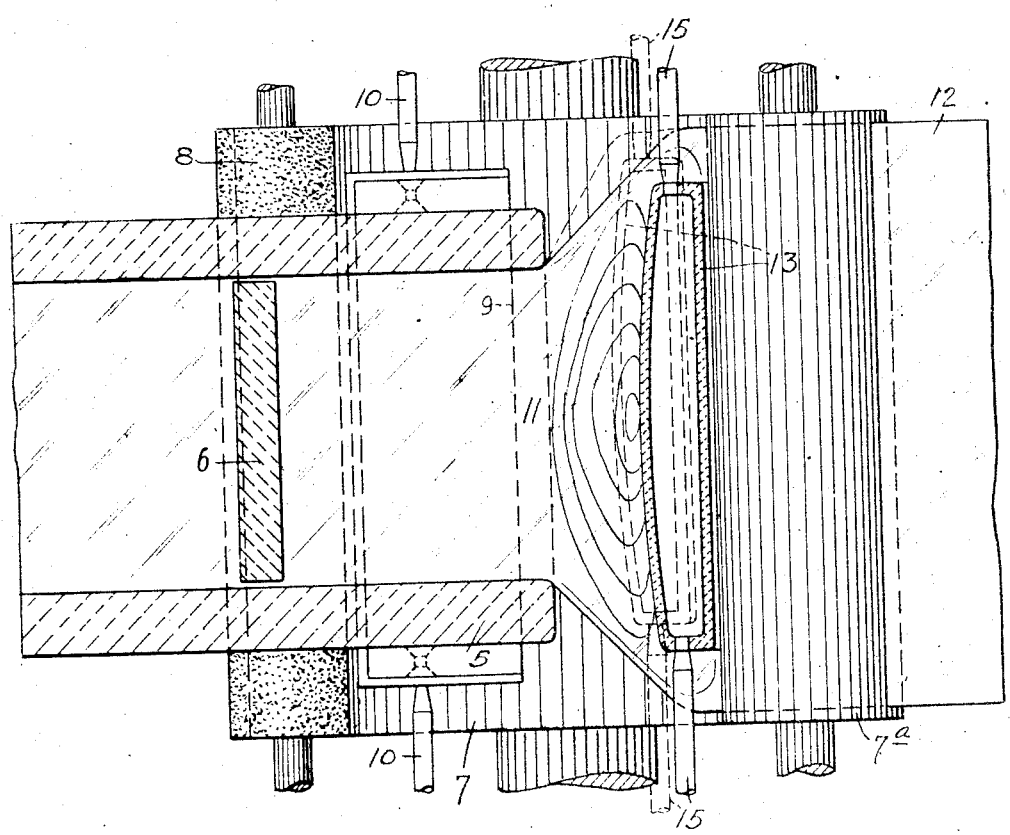

Aug. 14, 1928.  
J. F. BLACK  
1,680,588  
METHOD OF AND APPARATUS FOR FORMING SHEET GLASS  
Filed Feb. 2, 1926  
2 Sheets-Sheet 1
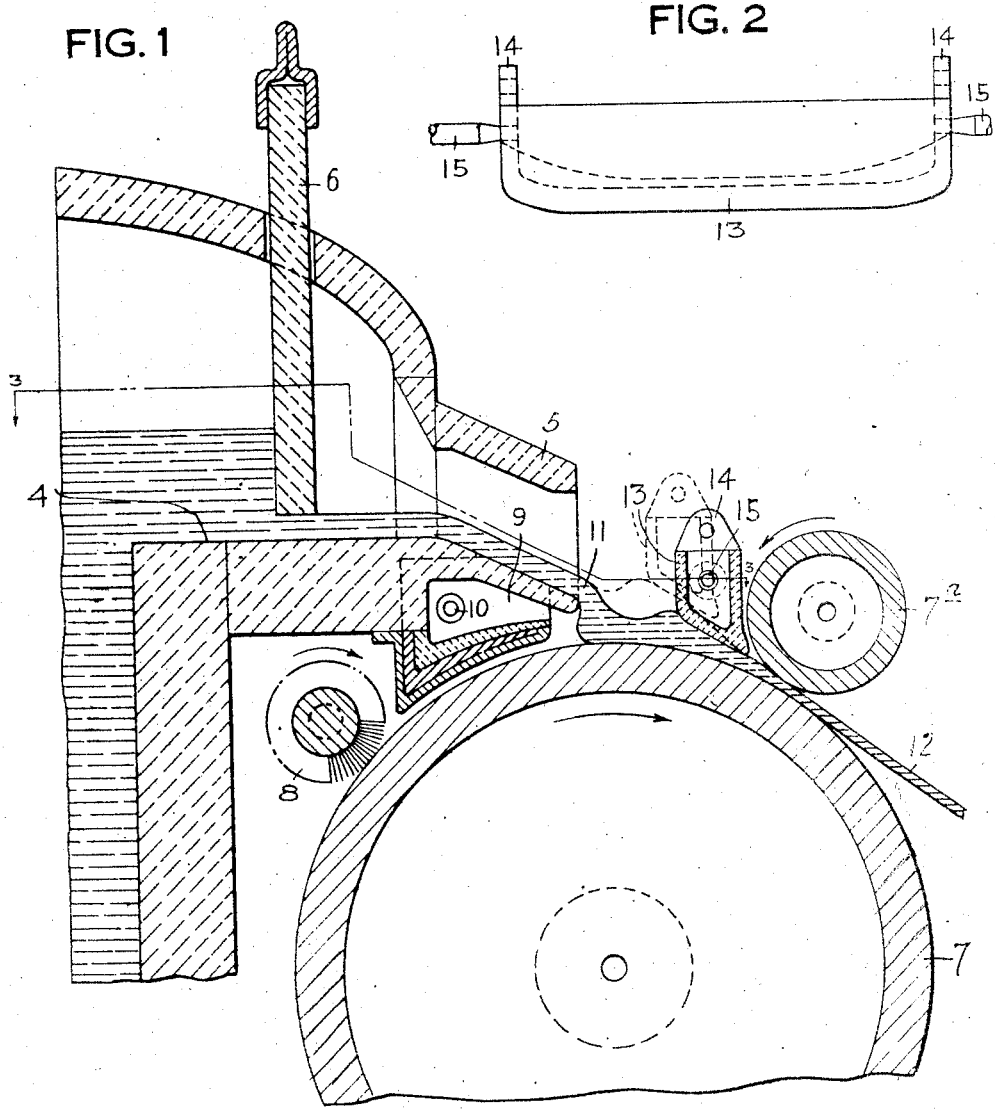
INVENTOR  
Jotham F. Black  
By Robson D. Brown  
Attorney Aug. 14, 1928.

J. F. BLACK 1,680,588

METHOD OF AND APPARATUS FOR FORMING SHEET GLASS

Filed Feb. 2, 1926.   2 Sheets-Sheet 2

INVENTOR
Jotham F. Black
By Robson D. Brown
Attorney

Patented Aug. 14, 1928.

1,680,588

UNITED STATES PATENT OFFICE.

JOTHAM F. BLACK, OF BUTLER, PENNSYLVANIA, ASSIGNOR TO HARTFORD-EMPIRE COMPANY, OF HARTFORD, CONNECTICUT, A CORPORATION OF DELAWARE.

METHOD OF AND APPARATUS FOR FORMING SHEET GLASS.

Application filed February 2, 1926. Serial No. 85,470.

My invention relates to a method of and apparatus for forming sheet glass, and is particularly suitable for the manufacture of plate glass by a continuous process.

Heretofore various attempts have been made to manufacture sheet glass by forming a sheet directly from a bath of molten glass contained in a furnace. One manner in which sheets known as plate glass have been manufactured consists in directing a stream of glass from a furnace through a spout and upon a bottom roll which functions as a table upon which the glass is flattened by a sheet-forming roll. The stream of glass has been made narrow relative to the width of the completed sheet so that it has sufficient depth to avoid excessive cooling and formation of overlaps or seams during the period required for it to travel from the body of molten glass to the forming roll. It has therefore been thought necessary to direct the stream against the mid portion of the forming roll where it is accumulated to a height sufficient to cause it to spread laterally along the face of the roll in order that a sheet of the proper width may be formed.

Contacting of the stream of glass in piled formation against the forming roll, which is usually water cooled, results in chilling of those particles of the glass which engage directly against the roll. The lateral spread causes these chilled particles to become mixed with the hotter particles, with the result that "ream" is present in the finished sheet. This ream causes such distortion of the lines of vision as to render the sheet unsuitable for the ordinary uses of plate glass.

My invention has for one of its objects the provision of means and a method whereby the stream of glass may be so controlled and manipulated as to minimize the formation of ream therein, and contemplates the provision of a deflecting member for maintaining the stream of glass out of contact with the forming roll except at approximately the instant that the glass is ready to enter between the forming roll and the lower roll.

Another object of my invention is to provide means for heating that portion of the stream which ordinarily becomes chilled during the spreading action above referred to.

One form which my invention may take is shown in the accompanying drawing, wherein Fig. 1 is an elevational sectional view of glass-forming apparatus embodying my invention; Fig. 2 is a front elevational view of the heating and deflecting block which I employ, and Fig. 3 is a longitudinal sectional view, taken on the line 3—3, of the apparatus of Fig. 1.

The apparatus comprises a tank having a forehearth 4 and a spout 5 through which a stream of glass is fed, the stream being controlled by a gate 6.

As the stream of glass emerges from the spout 5 it is deposited upon a roll 7 and is carried forward to a sheet-forming roll $7^a$. These rolls are preferably water cooled and are rotated, by any suitable means, in the direction indicated by the arrows. A brush roll 8 for cleaning the roll 7 is also provided.

The parts thus far described may be of any usual construction.

Beneath the spout 5 I provide a heating chamber 9 to which fuel may be supplied by burner pipes 10, for the purpose of maintaining the bottom wall of the spout 5 heated, so as to facilitate the flow of glass.

In the older practice above referred to, the glass stream 11 which emerges from the spout is of considerably less width than the finished sheet 12. This necessitates the accumulation of the glass against the face of a roll similar to the roll $7^a$ to such depth that it will spread with sufficient rapidity to maintain the width of the sheet of glass 12. In order to reduce the depth of the stream at its forward end and to keep it from piling against the forming roll $7^a$, I provide a recessed block 13, preferably of refractory material. The block 13 may be suspended in any suitable manner, as by means of ears 14 and may be adjusted toward and away from the face of the roll $7^a$, as well as vertically or transversely of the stream of glass, as indicated by dotted lines in Figs. 2 and 3. These adjustments may be made in various ways to effect proper distribution of the glass as conditions change.

Fuel pipes 15 communicate with the interior of the block 13. The block is preferably curved somewhat on its rear surface, as shown in Fig. 3, to facilitate the spread of the glass stream, and is maintained at sufficiently high temperature to prevent excessive chilling of those glass particles which come into contact therewith.

The stream of glass is therefore gradually reduced in depth before it comes into contact with the forming roll 7ª and premature chilling by contact with the forming roll is thereby eliminated, since the stream is not engaged by the forming roll until it is only slightly in excess of the thickness of the plate to be formed. Furthermore, the glass is in contact with the roll for only a comparatively short period of time. The arrangement also results in a more uniform reduction of thickness of the sheet when passing along the forming roll.

A skin is formed by the lower roll 7 upon the underside of the stream of glass, but the cold particles forming such skin do not tend to penetrate between the particles of the hotter glass, since the skin does not move relatively to the hot particles, except to stretch slightly.

I claim as my invention:

1. The method of forming sheet glass, which comprises directing a relatively narrow stream of molten glass against a heating and spreading member, and thereafter passing the steam beneath a forming roll.

2. The method which comprises directing a stream of glass between a surface that is movable in the direction of flow and a stationary heating surface.

3. Sheet-glass forming apparatus comprising means for delivering a relatively narrow stream of glass, a supporting surface for said glass, movable in the direction of the line of travel of the glass, a forming roll disposed above said surface, a spreading block mounted to the rear of the forming roll and at a height to engage the stream and effect spreading action thereof, and means for heating said block.

4. Sheet-glass forming apparatus comprising means for delivering a relatively narrow stream of glass, a supporting surface for said glass, movable in the direction of the line of travel of the glass, a forming roll disposed above said surface, a spreading block mounted to the rear of the forming roll and at a height to engage the stream and effect spreading action thereof, and means for heating said spreading block interiorly thereof, the said block being adjustable toward and from the forming roll in a direction longitudinally of the stream.

5. Sheet-glass forming apparatus comprising means for delivering a relatively narrow stream of glass, a supporting surface for said glass, movable in the direction of the line of travel of the glass, a forming roll disposed above said surface, and a spreading block mounted to the rear of the forming roll and at a height to engage the stream and effect spreading action thereof, the said block being curved upon its rear face.

6. Sheet-glass forming apparatus comprising means for delivering a relatively narrow stream of glass, a supporting surface for said glass, movable in the direction of the line of travel of the glass, a forming roll disposed above said surface, and a spreading block mounted to the rear of the forming roll and at a height to engage the stream and effect spreading action thereof, the said block being curved upon one of its glass-engaging faces.

7. Sheet-glass forming apparatus comprising means for delivering a relatively narrow stream of glass, a supporting surface for said glass, movable in the direction of the line of travel of the glass, a forming roll disposed above said surface, and a spreading block mounted to the rear of the forming roll and at a height to engage the stream and effect spreading action thereof, the said block having its glass contacting surface inclined to gradually reduce the thickness of the stream.

8. Sheet-glass forming apparatus, comprising means for delivering a relatively thick stream of glass, a supporting surface for said glass movable in the direction of the line of travel of the glass, a forming roll disposed above said surface, and a spreading block mounted to the rear of the forming roll and at a height to engage the stream and reduce the thickness thereof, the said block being adjustable toward and from the forming roll, in a direction longitudinally of the stream.

9. Sheet-glass forming apparatus, comprising a movable glass-receiving surface, means for directing a relatively thick stream of glass thereto, in the direction of movement of said surface, a normally stationary spreading member mounted in position to reduce the thickness of said stream, and means for heating said member.

10. The step in forming sheet glass from a relatively narrow body of molten glass, which comprises spreading said body to the desired width by a heating member.

Signed at Butler, Penna., this 9th day of January, 1926.

JOTHAM F. BLACK.